Nov. 28, 1967 K. PENNYCUICK 3,355,228
ROD MILLS
Filed March 19, 1965 4 Sheets-Sheet 3

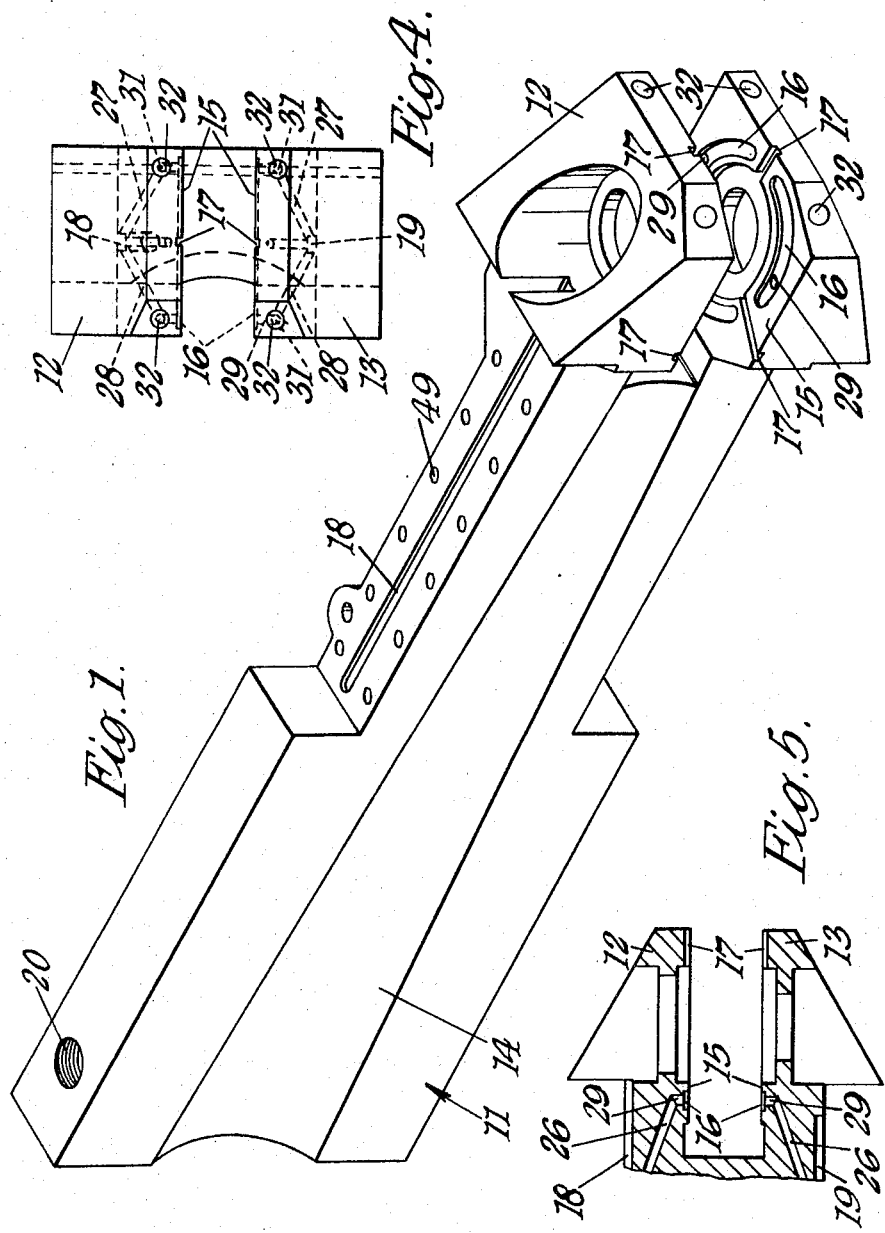

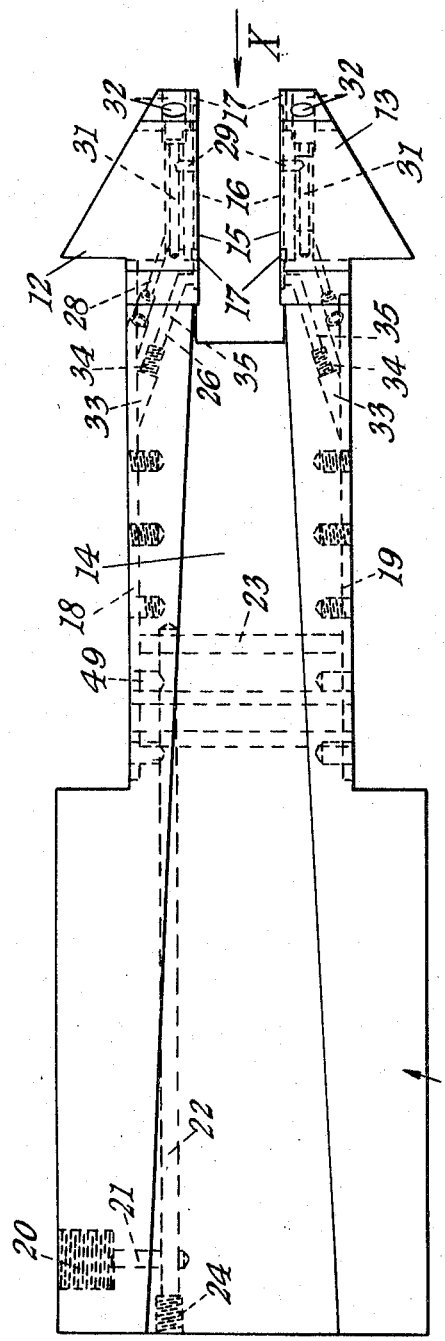
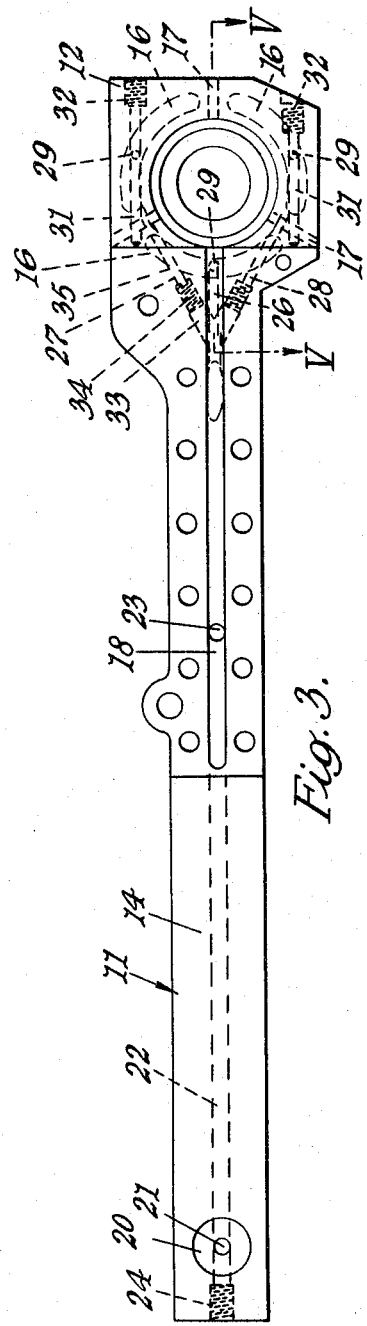

Inventor:
Kenneth Pennycuick
By Brown Jackson Boettcher
+ Diener Attys.

Nov. 28, 1967  K. PENNYCUICK  3,355,228
ROD MILLS

Filed March 19, 1965  4 Sheets-Sheet 4

Inventor:
Kenneth Pennycuick

United States Patent Office 3,355,228
Patented Nov. 28, 1967

3,355,228
ROD MILLS
Kenneth Pennycuick, Northill Grange, near Biggleswade, England, assignor to British Ropes Limited, Doncaster, England, a British company
Filed Mar. 19, 1965, Ser. No. 441,092
Claims priority, application Great Britain, Mar. 25, 1964, 12,554/64
2 Claims. (Cl. 308—9)

ABSTRACT OF THE DISCLOSURE

This invention relates to a final guide roller for a rod mill which, because of being subjected to high stressing at high rates of revolution, is supported in hydrostatic bearings preferably using a low viscosity fluid, such as water, at high pressure to produce the lubricating and supporting films.

---

This invention relates to rod mills, and more particularly to a final guide roller for such a mill.

The final guide rollers of rod mills are subjected to high stressing at high rates of revolution and hence in conventional practice their bearings need frequent replacement owing to the rapid wear which takes place.

Plain guides, if used, are also subject to rapid wear.

According to the invention a final guide roller of a rod mill is supported in hydrostatic bearings, preferably using water to produce the lubricating and supporting films.

The guide roller is preferably mounted between substantially plane faces of guide box sleeves and supported by films generated between those faces and adjacent faces of the roller.

Conveniently, a shaft is fixedly mounted in the guide box sleeves and the guide roller is journalled on the shaft by hydrostatic bearing films generated by water fed through the shaft.

In a preferred embodiment of the invention the pressurised water for the hydrostatic bearings is fed from a single pressure source along channels formed in supporting arms or leaves for the guide box sleeves, which channels branch at or near the outer ends of the arms or leaves to feed a plurality of pads between the faces of the sleeves and the roller and also to feed water through the shaft to pads between the shaft and roller. The channels may be formed by grooves in the arms or leaves closed by detachable capping members.

Such an arrangement provides a practicable and economic form of low friction robust bearing suitable for the arduous conditions under which the bearings of a final guide roller for a rod mill operate.

The invention will be further described with reference to a preferred embodiment as shown in the accompanying drawings, in which FIGURE 1 is an isometric view of a support leaf for a final guide roller;

FIGURE 2 is a side elevation of the leaf of FIGURE 1;

FIGURE 3 is a plan view of the leaf of FIGURE 1;

FIGURE 4 is an end elevation of the leaf of FIGURE 1 in the direction of the arrow X of FIGURE 2;

FIGURE 5 is a section on the line V—V of FIGURE 3;

Figure 6:
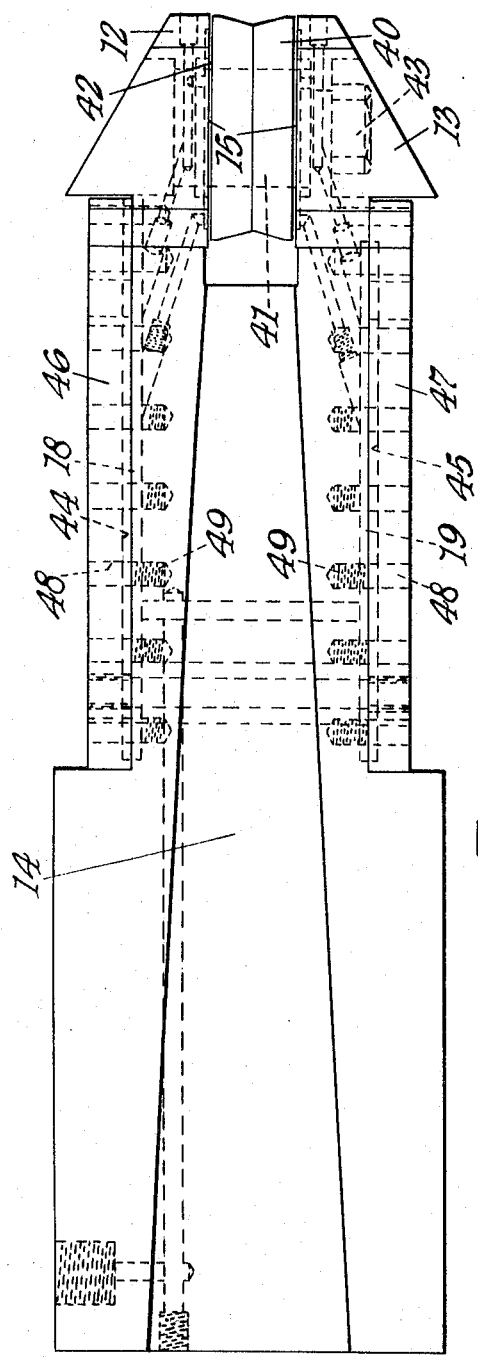
FIGURE 6 is a view similar to FIGURE 2 of an assembly of the guide roller in its bearing.

Referring first to FIGURES 1 to 5, there is shown a support leaf 11 for one of a pair of final guide rollers. The leaf is arranged to be rigidly held in the frame of rod mill. It comprises upper and lower box sleeves 12 and 13 and a supporting arm portion 14. Each box sleeve is machined from the solid and has an inner bearing face 15 formed with recesses 16 for distributing pressurised water over the bearing face 15 to form a hydrostatic bearing film between the face 15 and a mating face of a guide roller. Exhaust grooves 17 collect the water for recirculation or disposal.

The arm portion 14 is formed with upper and lower water feed grooves 18 and 19, e.g., one-sixteenth of an inch deep, which are fed from a pump or accumulator (not shown) via a union (not shown) threaded into a recess 20 and via drillings 21, 22 and 23, e.g., one eighth of an inch in diameter. A plug 24 seals the open end of drilling 22.

As can be seen from the drawings angled drillings 26, 27 and 28 lead from the grooves 18 and 19 to the recesses 16 via short vertical drillings 29. The drillings 26 communicate directly with the drillings 29 while drillings 27 and 28 communicate with the corresponding drillings 29 via horizontal drillings 31, the open ends of which are sealed by plugs 32.

Each of drillings 26, 27 and 28 has a comparatively large diameter, e.g., one-eighth of an inch, section 33 communicating with the groove 18 or 19, a threaded section 34 and a small diameter section 35, e.g., one sixteenth of an inch diameter or less. The threaded section 34 receives a restrictor (not shown) providing a passage of a few thousandths of an inch effective diameter. Such a restrictor may be tightened down or removed by means of a screw driver or other tool inserted down the comparatively large diameter section 33.

FIGURE 6 is similar to FIGURE 2, but shows the guide roller 40 rotatably mounted on a shaft 41 in the box sleeves 12 and 13. It will be seen that the roller 40 has flat faces 42 adjacent the bearing faces 15 of the box sleeves. The shaft 41 is retained by a nut 43.

The grooves 18 and 19 mate with and are closed by grooves 44 and 45 formed in removable caps 46 and 47 held onto the arm portion 14 by socket head screws (not shown) in the aligned holes 48 and 49.

Figure 7:
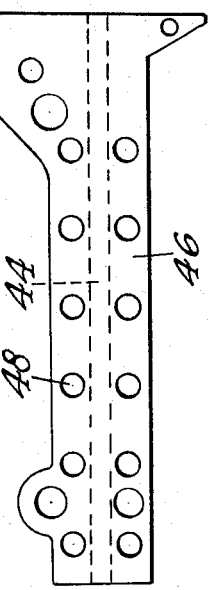
FIGURE 7 is a plan view of detail of FIGURE 6.

FIGURE 7 is a plan view of the cap 46.

It will be seen from FIGURE 6 that the grooves 19 and 45 do not extend to the outer end of the arm portion 14, whereas the grooves 18 and 44 do so extend. At the outer end they communicate with a radial bore 50 in the upper part of the shaft 41.

Figure 8:
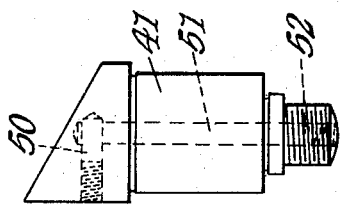
FIGURE 8 is a side elevation of a further detail of FIGURE 6.
Figure 9:
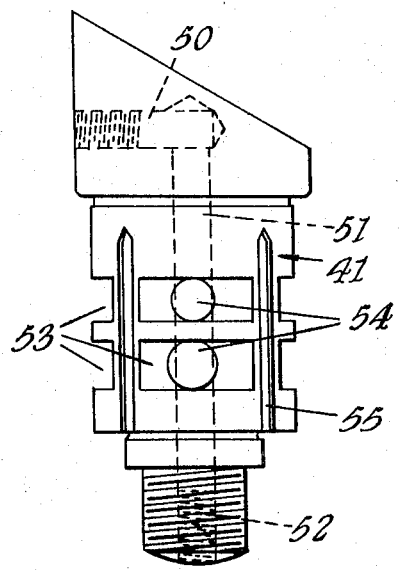
FIGURE 9 is a view similar to FIGURE 8 showing further detail structure.
Figure 10:
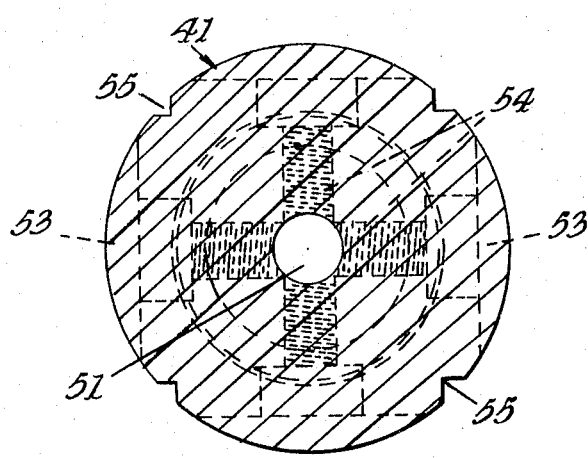
FIGURE 10 is a cross section through the structure of FIGURE 9 on an enlarged scale.

FIGURES 8, 9 and 10 show the shaft 41 in more detail. An axial bore 51 communicates with the bore 50 and has its lower end closed by a plug 52. The outer surface of the shaft 41 is formed with two rows of four recesses 53 forming pressure pads. The recesses 53 communicate with the axial bore 51 via restrictors (not shown) threadedly received in tapped radial passages 54. Between the recesses the shaft is formed with exhaust grooves 55. The recesses 53 support the roller 40 on the shaft.

The roller 40 is thus supported for rotation on the shaft and is also vertically supported between the faces 15 with a minimum of friction and wear.

The whole arrangement described provides a practicable and economic form of hydrostatic bearing where the passages are formed by closed grooves or comparatively simple drillings.

Various modifications may be made within the scope of the invention.

Thus, while the box sleeves are shown as having three pressure recesses 16, it is quite possible and may be desirable to have more or less than this number. In particular it is simpler to have only two recesses each extending round approximately 120° with 60° gaps between them. Diametrically opposed exhaust grooves may be located in the recesses. Such an arrangement reduces the number of passages to be provided and reduces the cost of the box sleeves and arm.

Another simplification which is possible is the elimination of the grooves 44 and 45 from the caps 46 and 47, relying solely on the grooves 18 and 19 to provide the main water channel.

I claim:

1. In a rod mill: a final guide roller assembly comprising a final guide roller having a pair of opposed plane faces, a pair of guide box sleeves located one at each side of the guide roller and having substantially plane faces adjacent the said plane faces of the guide roller, the said faces of the guide box sleeves having a plurality of recesses therein, a supporting arm for the guide box sleeves, said arm including channels formed by grooves in the arm for conveying pressurized supporting liquid to the recesses, the said channels branching in the region of the outer end of the supporting arm to supply the said plurality of said recesses, the arm comprising detachable capping members adapted to close the groove, and means for continuously feeding pressurized supporting liquid to said channel means and recesses to generate lubricating and supporting films between the adjacent plane faces of the guide box sleeve and the guide roller.

2. In a rod mill: a final guide roller assembly comprising a final guide roller having a pair of opposed plane faces, a pair of guide box sleeves located one at each side of the guide roller and having substantially plane faces adjacent the said plane faces of the guide roller, the said faces of the guide box sleeves having a plurality of recesses therein, a supporting arm for the guide box sleeves, said arm including channels formed by grooves in the arm for conveying pressurized supporting liquid to the recesses, the said channels branching in the region of the outer end of the supporting arm to supply the said plurality of said recesses, the arm comprising detachable capping members adapted to close the groove, each branch of the channel including a removable restrictor in a portion of the branch so aligned as to be accessible through the respective groove when the corresponding capping member is removed, and means for continuously feeding pressurized supporting liquid to said channel means and recesses to generate lubricating and supporting films between the adjacent plane faces of the guide box sleeve and the guide roller.

References Cited

UNITED STATES PATENTS

| | | | |
|---|---|---|---|
| 1,024,290 | 4/1912 | Snodgrass | 308—93 |
| 1,906,715 | 5/1933 | Penick | 308—9 |
| 2,684,272 | 7/1954 | Annen | 308—9 |
| 2,929,671 | 3/1960 | Taylor | 308—9 |
| 2,998,999 | 9/1961 | Morser et al. | 308—122 |

MARTIN P. SCHWADRON, *Primary Examiner.*

FRANK SUSKO, *Examiner.*